US008550334B2

(12) United States Patent
Gratton et al.

(10) Patent No.: US 8,550,334 B2
(45) Date of Patent: Oct. 8, 2013

(54) SYNCHING ONE OR MORE MATRIX CODES TO CONTENT RELATED TO A MULTIMEDIA PRESENTATION

(75) Inventors: Max S. Gratton, Lakewood, CO (US); John T. Kennedy, Denver, CO (US); William Michael Beals, Englewood, CO (US); Keith Gerhards, Parker, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 46 days.

(21) Appl. No.: 13/037,312

(22) Filed: Feb. 28, 2011

(65) Prior Publication Data
US 2012/0217292 A1 Aug. 30, 2012

(51) Int. Cl.
*G06F 17/00* (2006.01)

(52) U.S. Cl.
USPC .......................................................... 235/375

(58) Field of Classification Search
USPC .......................................................... 235/375
See application file for complete search history.

(56) References Cited

U.S. PATENT DOCUMENTS

| | | | |
|---|---|---|---|
| 4,809,325 A | | 2/1989 | Hayashi et al. |
| 4,837,414 A | | 6/1989 | Edamula |
| 5,510,603 A | | 4/1996 | Hess et al. |
| 5,581,636 A | | 12/1996 | Skinger |
| 5,602,377 A | | 2/1997 | Beller et al. |
| 5,703,349 A | | 12/1997 | Meyerson et al. |
| 5,959,285 A | * | 9/1999 | Schuessler .............. 235/462.04 |
| 5,978,855 A | | 11/1999 | Metz et al. |
| 6,006,990 A | | 12/1999 | Ye et al. |
| 6,058,238 A | | 5/2000 | Ng |
| 6,512,919 B2 | * | 1/2003 | Ogasawara ............... 455/422.1 |
| 6,556,273 B1 | | 4/2003 | Wheeler et al. |
| 6,983,304 B2 | | 1/2006 | Sato |
| 7,206,029 B2 | | 4/2007 | Cohen-Solal |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

"Android App Reviews & Showcase Just a Tapp Away," Android Tapp, 10 pp. Found online at http://www.androidtapp.com/download-the-weather-channel-android-app-from-your-tv/, Oct. 22, 2010.

(Continued)

*Primary Examiner* — Jamara Franklin
(74) *Attorney, Agent, or Firm* — Kilpatrick Townsend & Stockton LLP

(57) ABSTRACT

One embodiment described herein may take the form of a system or method for generating one or more matrix codes that may then be obtained by a reader device, the one or more matrix codes including information that may be utilized to access additional content related to one or more multimedia presentations. For example, the information contained within the one or more matrix codes may include one or more web addresses that, when selected, may link to one or more webpages on the Internet containing information related to the multimedia presentation. In another example, the information contained within the matrix codes may include instructions that may be executed by an electronic device to provide the additional content. The additional content may be displayed a display device associated with the distribution system, on a reader device, or any electronic device that includes a display.

20 Claims, 6 Drawing Sheets

(56) References Cited

U.S. PATENT DOCUMENTS

| | | | |
|---|---|---|---|
| 7,206,409 B2 | 4/2007 | Antonellis et al. |
| 7,221,405 B2 | 5/2007 | Basson et al. |
| 7,328,848 B2 | 2/2008 | Xia et al. |
| 7,349,668 B2 * | 3/2008 | Ilan et al. ............... 455/66.1 |
| 7,369,180 B2 | 5/2008 | Xing |
| 7,387,250 B2 * | 6/2008 | Muni ............... 235/462.01 |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 2001/0037297 A1 | 11/2001 | McNair |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0092154 A1 | 4/2008 | Hogyoku |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0039573 A1 | 2/2011 | Hardie |
| 2011/0065451 A1 | 3/2011 | Danado et al. |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2011/0314485 A1 | 12/2011 | Abed |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |

(56) References Cited

FOREIGN PATENT DOCUMENTS

| | | |
|---|---|---|
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 325 765 A | 12/1998 |
| GB | 2 471 567 A | 1/2011 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2011/009055 A2 | 1/2011 |

OTHER PUBLICATIONS

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.htrnl?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

International Search Report and Written Opinion of PCT/US11/63111 mailed on Apr. 4, 2012, 9 pages.

International Search Report and Written Opinion of PCT/US11/64709 mailed on Apr. 10, 2012, 8 pages.

International Search Report and Written Opinion of PCT/US2011/060098 mailed on Mar. 29, 2012, 10 pages.

International Search Report and Written Opinion of PCT/US2011/063308 mailed on Mar. 29, 2012, 10 pages.

International Search Report and Written Opinion of PCT/US2011/068176 mailed on Mar. 29, 2012, 15 pages.

Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.

U.S. Appl. No. 12/961,369, filed Dec. 6, 2010, Office Action mailed Mar. 9, 2012, 17 pages.

U.S. Appl. No. 12/971,349, filed Dec. 17, 2010, Office Action mailed Nov. 10, 2011, 9 pages.

U.S. Appl. No. 12/971,349, filed Dec. 17, 2010, Final Office Action mailed Jan. 20, 2012, 10 pages.

U.S. Appl. No. 12/986,721, filed Jan. 7, 2011, Office Action mailed Mar. 16, 2012, 6 pages.

Extended European Search Report for EP 12152690.9 dated Jun. 19, 2012, 9 pages.

International Search Report and Written Opinion of PCT/US2012/026624 mailed Aug. 29, 2012, 14 pages.

U.S. Appl. No. 12/958,073, filed Dec. 1, 2010, Office Action mailed Aug. 31, 2012, 12 pages.

U.S. Appl. No. 12/961,369, filed Dec. 6, 2010, Final Rejection mailed Oct. 30, 2012, 17 pages.

U.S. Appl. No. 12/971,349, filed Dec. 7, 2010 ), Final Rejection mailed Oct. 24, 2012, 11 pages.

U.S. Appl. No. 12/953,227, filed Nov. 23, 2010, Office Action mailed Nov. 7, 2012, 31 pages.

U.S. Appl. No. 13/015,382, filed Jan. 27, 2011, Office Action Mailed Nov. 13, 2012, 7 pages.

U.S. Appl. No. 13/016,483, filed Jan. 28, 2011 Office Action mailed Nov. 2, 2012, 18 pages.

U.S. Appl. No. 12/953,273, filed Nov. 23, 2010, Notice of Allowance, mailed Oct. 18, 2012, 11 pages.

U.S. Appl. No. 13/034,482, filed Feb. 24, 2011, Office Action mailed Oct. 19, 2012, 11 pages.

U.S. Appl. No. 13/035,474, filed Feb. 25, 2011, Office Action mailed Oct. 30, 2012, 11 pages.

U.S. Appl. No. 12/960,285, filed Dec. 3, 2010, Final Office Action mailed Dec. 6, 2012, 17 pages.

U.S. Appl. No. 12/984,385, filed Jan. 4, 2011, Notice of Allowance mailed Nov. 28, 2012, 11 pages.

Byford, D., "Universal Interactive Device," International Business Machines Corporation, Jun. 1998, 1 page.

International Search Report and Written Opinion of PCT/US11/60094 mailed on Mar. 30, 2012, 7 pages.

International Search Report of PCT/US11/60109 mailed on Feb. 14, 2012, 3 pages.

(56) References Cited

OTHER PUBLICATIONS

International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.

* cited by examiner

SYNCHING ONE OR MORE MATRIX CODES TO CONTENT RELATED TO A MULTIMEDIA PRESENTATION

TECHNICAL FIELD

Embodiments disclosed herein relate generally to providing information in one or more matrix codes, and more particularly to utilizing one or more matrix codes to access additional content related to one or more multimedia presentations provided through a distribution system.

BACKGROUND

Barcodes and other optical machine-readable data representations are often used in commerce to provide a quick method of obtaining information about a product or service. In general, a barcode consists of varying widths of lines that may be read by a scanner, where the widths and spaces between the lines of the barcode provide information, such as an identification number of a product. Because the information of a barcode is conveyed through the varying widths of the lines of the code, barcodes are often referred to as linear or one-dimensional (1D) codes. In more recent years, a matrix (or two-dimensional) code has been developed to provide additional information in the code by encoding information in both the width and height dimensions of the matrix. Matrix codes, one example of which is as a quick response (QR) code, generally consist of black modules arranged in a square pattern on a white background, the configuration of which provides information to a scanner or reader. In this manner, matrix codes may be utilized to convey information to any electronic device once obtained by the scanner or reader device.

BRIEF SUMMARY

One implementation may take the form of a method for providing content to a user of a system. The method may comprise the operations of generating, utilizing an electronic device, one or more matrix codes including at least one link to additional content related to one or more multimedia presentations, transmitting, utilizing the electronic device, the one or more matrix codes and the one or more multimedia presentations to at least one display device and receiving the at least one link to additional content from a reader device. In addition, the method may include the operations of accessing additional content related to the one or more multimedia presentations associated with the at least one link and providing the additional content related to the one or more multimedia presentations to the user of the system.

Another implementation may take the form of a system for providing content to a user of a distribution system. The system may comprise an electronic device comprising at least one processing unit that generates one or more matrix codes including information for a computing device to access additional content related to one or more multimedia presentations and at least one output component in communication with a display device, wherein the at least one processing unit transmits the one or more matrix codes and the one or more multimedia presentations to the display device utilizing the output component. The system may also include a reader device comprising at least one optical input component configured to obtain an image of the one or more matrix codes and at least one processing unit configured to decode the obtained one or more matrix codes to retrieve information for a computing device to access additional content related to one or more multimedia presentations. Further, the retrieved information is utilized by a computing device to provide the additional content related to the one or more multimedia presentations to a user of the system.

Yet another implementation may take the form of a method for obtaining content associated with one or more multimedia presentations. The method may comprise the operations of generating, utilizing an electronic device, one or more matrix codes including instructions to a computing device to access additional content related to one or more multimedia presentations, transmitting, utilizing the electronic device, the one or more matrix codes and the one or more multimedia presentations to at least one display device and obtaining, utilizing a reader device, the one or more matrix codes from the at least one display device. The method may also include the operations of retrieving the instructions to access additional content related to one or more multimedia presentations by decoding the obtained one or more matrix codes, transmitting the instructions to access additional content related to one or more multimedia presentations to a computing device, executing, utilizing the computing device, the instructions to access additional content related to one or more multimedia presentations and providing the additional content related to the one or more multimedia presentations to the user of the system.

DETAILED DESCRIPTION

One embodiment described herein may take the form of a system or method for generating one or more matrix codes that may then be obtained by a reader device, the one or more matrix codes including information that may be utilized to access additional content related to one or more multimedia presentations. For example, the information contained within the one or more matrix codes may include one or more web addresses that, when selected, may link to one or more webpages on the Internet containing information related to a multimedia presentation. In another example, the information contained within the one or more matrix codes may include instructions that may be provided to an electronic device to access and provide the additional content to a user of the system. In yet another example, the information contained within the one or more matrix codes may include prices and/or purchasing information for one or more items in the multimedia presentation. In general, the one or more matrix codes may be obtained and decoded by one or more devices of the system such that the information encoded with the codes may be determined. Also, the additional content related to the multimedia presentation may be displayed to a user of the system on a display device associated with the distribution system, on a reader device, on any other mobile device or on any electronic device that includes a display. Once displayed, the information may be further accessed or selected by a user to retrieve additional content.

Figure 1:
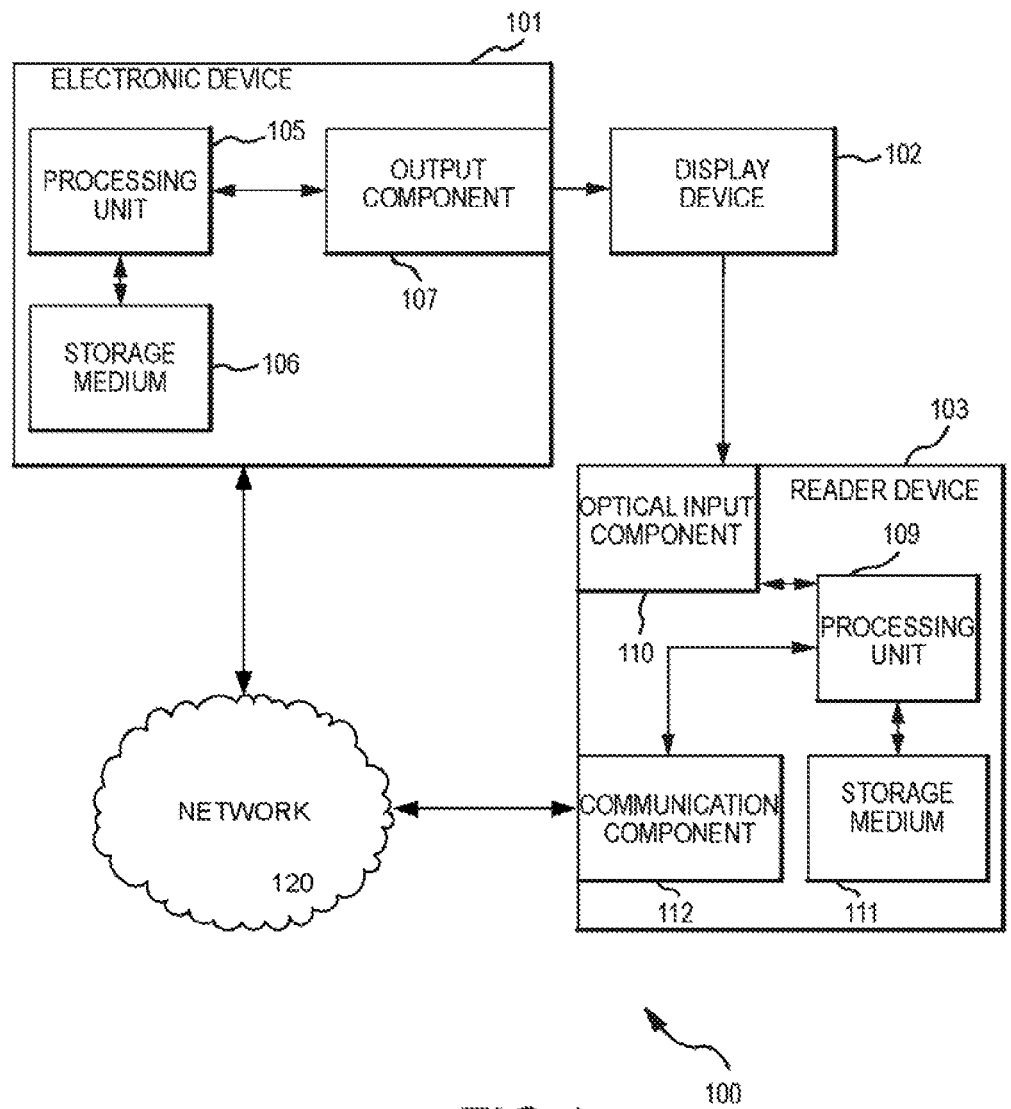
FIG. 1 is a block diagram illustrating a system for providing a multimedia presentation and for utilizing one or more matrix codes that include information for accessing additional content related to the multimedia presentation.

FIG. 1 is a block diagram illustrating a system 100 for providing a multimedia presentation and for utilizing one or more matrix codes that include information for accessing additional content related to the multimedia presentation. In general, the system 100 may include a electronic device 101 (which may be any kind of electronic device such as a television, a television receiver, a digital video recorder, a digital video disc player, an automobile, a computing device, a telephone, a kitchen appliance, a video game system, a security system, and so on), at least one display device 102 (which may be any kind of display device such as a cathode ray tube display, a liquid crystal display, a television, a computer monitor, a projector display, and so on), and a reader device 103 (which may be any type of device capable of detecting and decoding a matrix code such as a mobile telephone equipped with a camera, a mobile computing device that includes a camera, a remote control and so on). One or more networks may also be included in the system (illustrated as a single network 120 in FIG. 1) for receiving information from the reader device 103 and/or providing information or multimedia presentations to the electronic device 101 for display on the display device.

The electronic device 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), and one or more output components 107. The output components 107 may be configured to communicate with a display device 102, including providing one or more matrix codes for display on the display device in addition to providing a multimedia presentation to the display. Additionally, although the display device 102 is illustrated as separate from the electronic device, it is understood that in various implementations of the system, the display device may be incorporated into the electronic device. The processing unit 105 of the electronic device 101 may execute instructions stored in the non-transitory storage medium 106 to dynamically generate one or more matrix codes (such as one or more QR codes), provide one or more multimedia presentations to the display and transmit the dynamically generated matrix codes and multimedia presentations to the display device 102 utilizing the output component 107.

In one embodiment, the electronic device 101 may be a receiver of a multimedia presentation distribution system. In such an embodiment, the receiver 101 of the system may receive an encrypted signal of a multimedia presentation and convert it into a signal that a display or other compatible device may recognize and manipulate in order to present the multimedia presentation to one or more users. In addition, the receiver 101 may provide the converted signal to a display device 102, such as a television or computer screen, for display to the user. In one implementation, the receiver 101 may receive the encrypted signal from a satellite or through a digital cable or network connection, collectively shown in FIG. 1 as network 120.

A reader device 103 may also be included in the system and may detect the one or more matrix codes displayed by the display device 102. The reader device may also decode the information contained within the obtained matrix codes, such as information concerning the electronic device and/or a multimedia presentation provided by the electronic device 101. The reader device may include one or more processing units 109 which execute instructions stored in one or more non-transitory storage media 111 in order to receive the one or more matrix codes and either provide the received matrix codes to the network 120 or decode the information within the matrix codes. The reader device may also include an optical input device 110 (such as a camera, a barcode scanner, and so on) for detecting the matrix code displayed by the display device as well as a communication component 112 for communicating with one or more networks to provide the obtained matrix codes or decoded information to one or more networks 120.

One or more networks 120 may also be included in the system 100. The networks 120 may communicate with electronic device 101 and/or the reader device 103. In one implementation when communicating the with reader device 103, the network 120 may receive the obtained matrix code. In another implementation, the network may receive the information contained within the obtained matrix codes after such information is decoded from the matrix code by the reader device 103. In addition, the network may provide information, such as the information received from the reader device 103 and obtained from the matrix code, to the electronic device 101 or to a related electronic device, such as a server device associated with the network. Further, in the implementation where the electronic device 101 is a receiver of a multimedia distribution system, the network 120 may also provide one or more multimedia presentations for display on the display device 102. As should be appreciated, the transmission of information to or from the network may occur in any manner known or hereafter developed, including but not limited to, transmission through a network connection or a wireless transmission.

In various implementations, the electronic device 101 may transmit the one or more matrix codes by themselves to the display device 102 via the output component 107 for the display device to display only the one or more matrix codes at a particular time. However, in various other implementations (such as implementations where the electronic device is a television receiver, digital video recorder, or other such device that provides images to a display), the electronic device may transmit one or more images (such as a video stream of a multimedia presentation) to the display device via the output component. In such implementations, the electronic device may combine the one or more matrix codes with the one or more images and transmit the combination to the display device via the output component.

Figure 2:
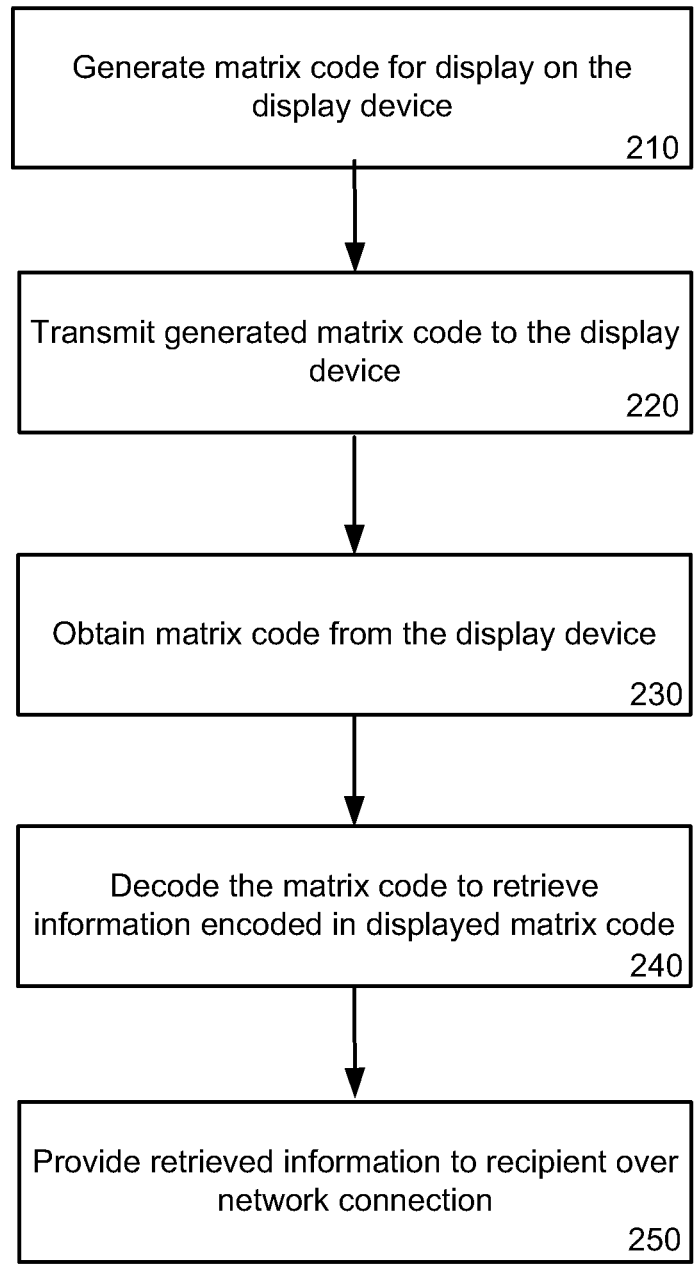
FIG. 2 is a flowchart depicting a method for a system to generate one or more matrix codes to provide information for accessing additional content related to the multimedia presentation.

As mentioned above, the one or more matrix codes generated by the electronic device may be utilized to access content related to and in addition to one or more multimedia presentations. FIG. 2 is a flowchart depicting a method for a system (such as that illustrated in FIG. 1) to generate one or more matrix codes to provide information for accessing the additional content related to the multimedia presentation. In one example, the method of FIG. 2 may be utilized by a multimedia distribution system to provide additional online content to a user of the system related to a multimedia presentation that the user may be viewing.

Beginning in operation 210, the electronic device may generate a matrix code for display on the display device. In general, the generated matrix code may include any information related one or more components of the distribution system or related to one or more multimedia presentations provided by the distribution system. For example, the information contained within the one or more matrix codes may include one or more web addresses related to a multimedia presentation, such as web address for one or more distributors of a product featured in the multimedia presentation. Thus, when one of the web addresses is selected, a user may be linked to one or more webpages on the Internet containing information related to items featured in the multimedia presentation. In another embodiment, the information contained within the one or more matrix codes may include instructions that may be provided to an electronic device, such as a server associated with a network, that may execute the instructions to access and provide the additional content to a user of the system. For example, the information may include several instructions to a server to create a multi-day vacation package for the user, including air fare and hotel options, that relates to a multimedia presentation on the user's display device. These are but two examples of the type of information that may be provided in the one or more matrix codes related to the multimedia presentation.

Figure 3:
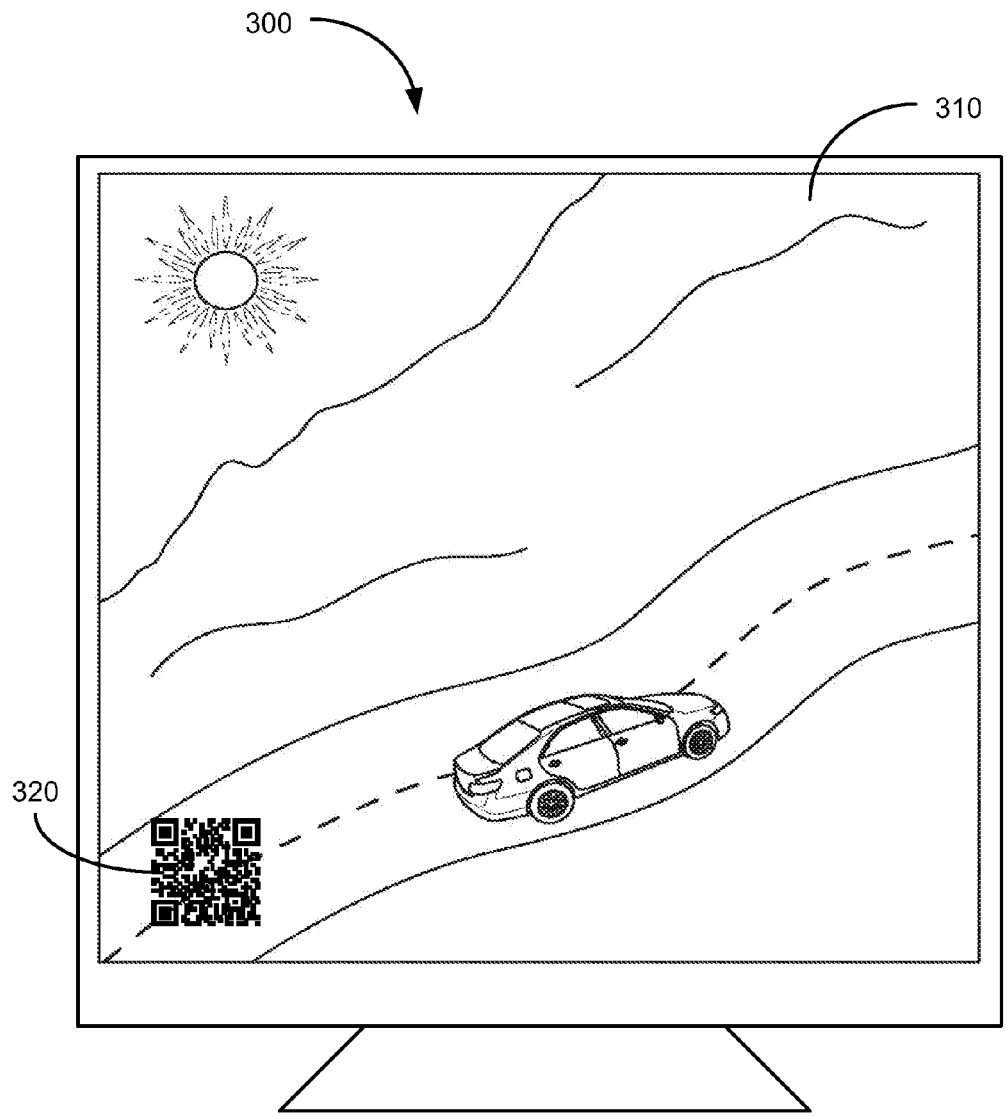
FIG. 3 is a diagram of a display device of a distribution system displaying a multimedia presentation and a matrix code containing information for accessing additional content related to the multimedia presentation.

In operation 220, the electronic device may transmit the generated matrix code to a display device for display on the display device. As mentioned above, the matrix code may be displayed alone on the display device or may be incorporated into another image, such as into an image or frame of a video component of a multimedia presentation. For example, FIG. 3 is a diagram of a display device 300 displaying a multimedia presentation 310 and a matrix code 320 containing information providing access to additional content related to the multimedia presentation. As shown, the matrix code 320 may be integrated into a multimedia presentation 310 for display. In addition, while the diagram of FIG. 3 shows a single matrix code displayed, it should be appreciated that a plurality of matrix codes may be displayed on the display device, as described in more detail below with respect to FIG. 6. Also, it should be appreciated that the one or more matrix codes 320 may be displayed on the display device with no accompanying multimedia presentation.

Once the matrix code is displayed on the display device, the matrix code may be obtained from the display by the reader device in operation 230. As described above, the reader device may obtain the matrix code from the display device by capturing a still image or video of the display screen. Further, the reader device may be configured to locate a matrix code embedded within a displayed image or frame of a video component of a multimedia presentation. To obtain the matrix code from an image, the reader device may utilize image recognition technology to isolate the matrix code and ignore the portions of the image not including the matrix code. For example, the reader device may utilize edge detection technology to analyze the captured image and detect the edges of the matrix code to isolate the code. In another example, the reader device may conduct a pattern recognition analysis on the captured image to detect the matrix code. In general to obtain the matrix code, the reader device may obtain a still image (utilizing an optical device) or video (utilizing a video camera) of the display screen containing the matrix code.

In operation 240, the matrix code may be decoded to retrieve the information contained within the matrix code. In one embodiment, the reader device may perform the analysis on the obtained matrix code to retrieve the encoded information. As mentioned above, the reader device may utilize one or more processing units to decode the matrix code and retrieve the information contained within the matrix code. Further, although described above with reference only to a reader device, one of several components of the distribution system may be utilized to retrieve the encoded information. For example, in one embodiment, the obtained matrix code may be transmitted over the network to a recipient for analysis and decoding. In another embodiment, the retrieved information may be transmitted over the network to the electronic device for analysis. In yet another embodiment, the obtained matrix code may be transmitted unanalyzed through the network to an electronic device outside of the system, such as to an electronic device associated with an installer of a distribution system. In this embodiment, the electronic device outside of the system may analyze and retrieve the encoded information from the matrix code.

Utilizing the system of FIG. 1 and/or the method of FIG. 2, one or more matrix codes may be generated and obtained that may include information providing access to additional content related to one or more multimedia presentations. For example, as discussed above, information contained within the one or more matrix codes may include one or more web addresses related to a multimedia presentation, such as web address for one or more distributors of a product featured in the multimedia presentation. To generate the one or more matrix codes, a receiver of a distribution may obtain information related to a multimedia presentation transmitted to a display device. This information may be generated by the receiver, or may be received at the receiver from the distribution system, such as through metadata accompanying the multimedia presentation. The receiver may then generate one or more matrix codes that include the information encoded with in the codes. In this example, the one or more web addresses may be encoded within the matrix codes. Upon generation, the receiver may transmit the one or more matrix codes for display on a display device. FIG. 3 includes one example of a matrix code 320 displayed on a display device 300. Once displayed, the one or more matrix codes may be obtained and decoded by a reader device to retrieve the encoded information, as described above.

Figure 4:
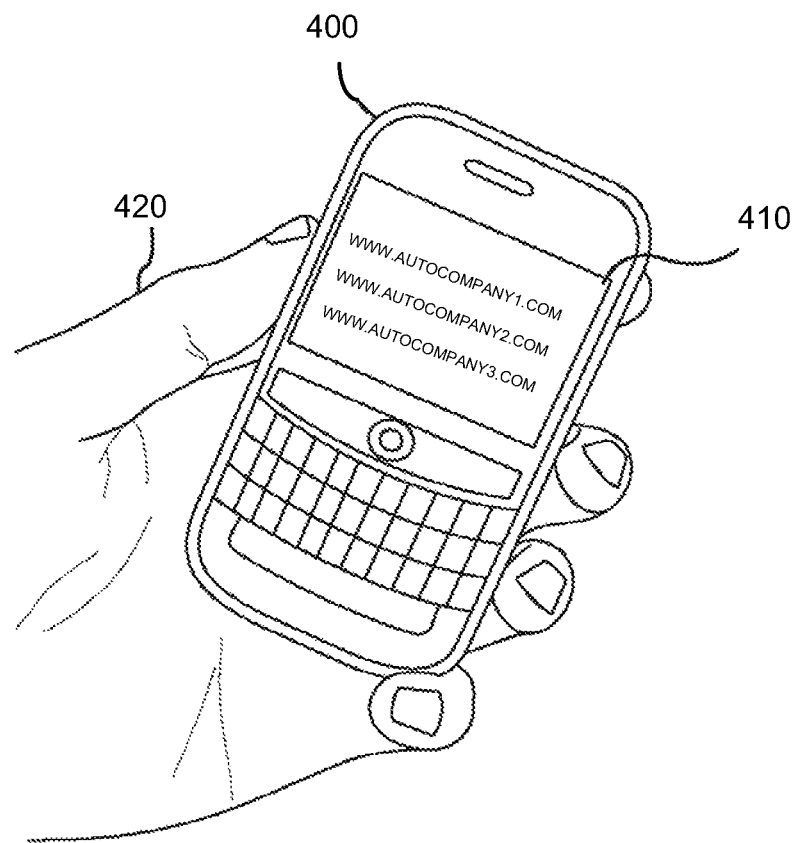
FIG. 4 is a diagram of a mobile device displaying additional content related to one or more multimedia presentations accessed by utilizing information contained in one or more matrix codes.

In one embodiment, the retrieved information may be processed and provided to a user through the reader device. For example, FIG. 4 is a diagram of a mobile device 400 displaying additional content 410 related to one or more multimedia presentations accessed by utilizing information contained in one or more matrix codes. In the example shown, the mobile device 400 operated by a user 420 may be utilized to obtain the one or matrix codes displayed on a display device. Once obtained, the mobile device 400 may decode the matrix codes to retrieve the information encoded within the codes. Once the information is retrieved, the mobile device 400 may process the information and provide additional content to the user 420, such as a list of websites related to the multimedia presentation. For example, during a multimedia presentation showing a car chase, one or more matrix codes may be displayed. The user 420 may utilize the mobile device 400 to obtain the matrix codes if the user is interested in the cars shown. Upon obtaining the codes, the mobile device 400 may provide a list of web addresses that link to distributors of the cars shown in the user's area. In addition, the user may utilize an input device associated with the mobile device 400 to select one or more of the web addresses to access the associated webpages for more information on the cars shown. The selected webpages may then be displayed on the mobile device 400. In this manner, the displayed matrix codes may provide additional content to the user 420 of a multimedia presentation.

Figure 5:
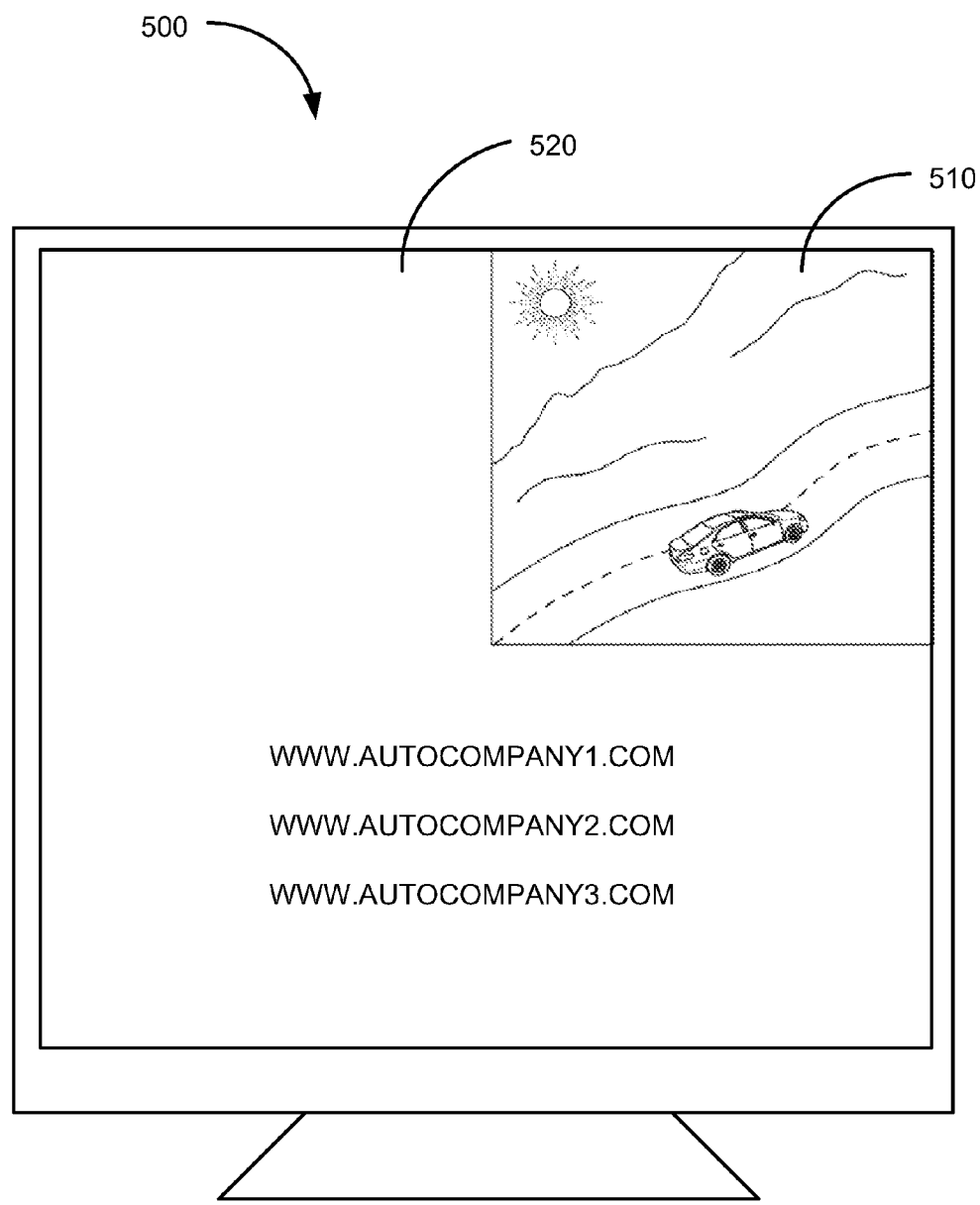
FIG. 5 is a diagram of a display device of a distribution system displaying a multimedia presentation and additional related content accessed by utilizing information contained in one or more matrix codes.

In another embodiment, the retrieved information may be provided to the receiver over a network such that the information may be displayed to a user on the display device. In this embodiment, the one or more matrix codes may be obtained by the reader device such that the information contained within or the matrix codes themselves may be provided to an electronic device, such as a receiver. Upon receipt, the receiver may retrieve the encoded information and process such information in a similar manner as described above with relation to the reader device. In addition, once the information is retrieved, such information may be provided to a user of the system through the display device of the system. For example, FIG. 5 is a diagram of a display device 500 of a distribution system displaying a multimedia presentation 510 and additional related content 520 accessed by utilizing information contained in one or more matrix codes. In the example shown, the video component 510 of the multimedia presentation may be located within a smaller window on the user's display device 500 while the additional content 520 comprises the rest of the display space of the display device. In other embodiments, the additional content may comprise the entire display space such that the video component is no longer displayed. In yet another embodiment, the additional content may be provided within an interactive television feature of the receiver and displayed on the user's display device 500.

Similar to the embodiment where the additional content is provided on a mobile device, this particular embodiment may utilize the display device 500 to provide additional content related to the multimedia presentation to a user. Thus, in the example shown, a list of web addresses linking to one or more webpages of distributors of an item featured in the multimedia presentation may be provided. In addition, a user of the display device may utilize an input device, such as a remote control to the receiver or display device, to select one of the provided web addresses. Upon selection, the receiver may provide the associated webpage of the selected distributor in the additional content section 520 of the display device 500 such that the user may receive additional information about the featured item in the multimedia presentation.

While FIGS. 4 and 5 show the additional content as a list of web addresses, it should be appreciated that any content related to the multimedia presentation may be provided in a similar manner in response to the information contained within the one or more matrix codes. For example, the information contained in the one or more matrix codes may link to a video, audio or text component that relates to the multimedia presentation. Thus, upon retrieving the information, the reader device or other electronic device may access a video, audio or text component and display said component to a user. For example, during a portion of a multimedia presentation in which a song is played, one or more matrix codes may be presented on the user's display device. A the user may then utilize a reader device obtain the codes and, in response, the reader device may begin playing a music video of the song. In addition, the reader device may also provide a history of the song, the artist performing the song, links to distributors of the music and/or any information related to the song. In a similar manner, a video of the making of and/or a trailer of a television program or movie may also be accessed through the information in the one or more matrix codes. Also, a text file containing live game or season long statistics for a team or player featured during a sporting event may also be accessed as described above. Similarly, an inventory and available prices of several items displayed in the multimedia presentation may be accessed through the one or more matrix codes. In general, any video, audio or text component containing information related to the multimedia presentation may be provided to a user utilizing the systems and methods described above.

Additionally, the reader device or other electronic device that receives the information from the matrix codes may perform several operations prior to display of the additional content. For example, one or more matrix codes may be displayed during a segment on a travel-centric channel of a distribution system, such as a segment discussing an African safari. Information concerning the safari may be encoded into the one or more matrix codes that may instruct a reader device to prepare a travel itinerary for a user of the distribution system. Thus, once the information from the matrix codes is retrieved, the reader device may access one or more links to gather additional information about the safari vacation. In addition, the reader device may maintain information about a user and provide said user information to the one or more links to tailor the additional information. In one example, the reader device may create a travel package tailored to the user of the reader device, including airfare and hotel bookings in relation to the safari program displayed. Thus, to prepare the travel package, the information contained in the one or more matrix codes may include links to the related web pages as well as instructions to the reader device on how to create the package and what user information may be needed. Once the package is created, the package may be displayed to the user with the option to purchase the package utilizing an input device.

In another embodiment, one or more additional components of the system may be utilized to perform the operations included in the information of the matrix codes and/or obtain the additional content provided to a user of the system. For example, the reader device may obtain the one or more displayed matrix codes and retrieve the encoded information. Upon retrieval, the reader device may then provide the instructions and any other information to an electronic device, such as a server of a network, that may execute the instructions to obtain the additional content. Thus, continuing the above example, the instructions and other information may be provided to the electronic device such that the electronic device may gather the travel information to be presented as part of the travel package. Once the additional content is gathered, the electronic device may provide the content back to the reader device or to another device for display to the user. In other embodiments, a portion of the information gathering may be performed by the electronic device while the remaining portion may be performed by the reader device. In this manner, any number of electronic devices may be employed by the system to gather the additional content related to the multimedia presentation as directed by the information in the one or more matrix codes.

Figure 6:
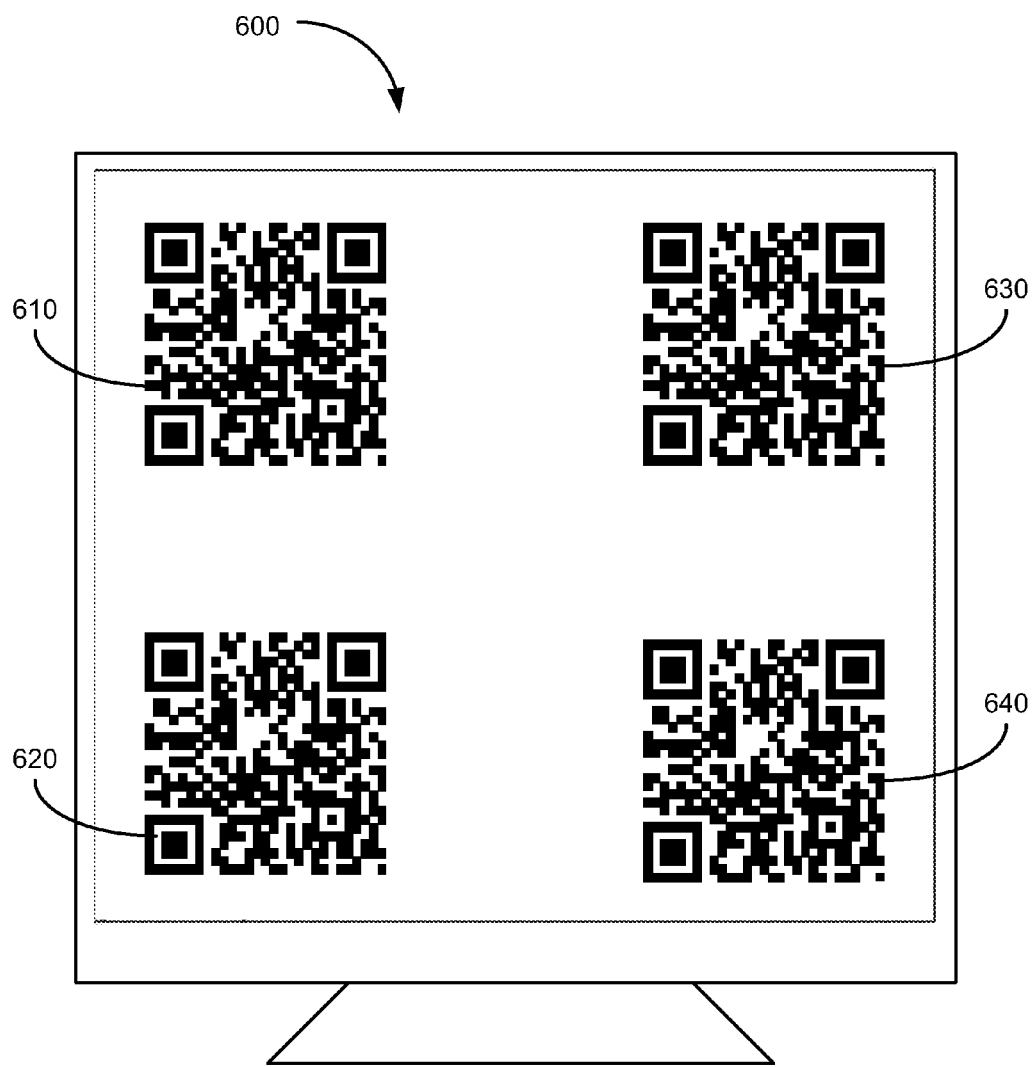
FIG. 6 is a diagram of a display device of a distribution system displaying a plurality of matrix codes containing information for accessing additional content related to the multimedia presentation.

As may be appreciated, some additional content related to the multimedia presentation may require several instructions to one or more electronic devices to gather the information. For example, the additional content may provide a travel package for a multiple-day, multiple-country vacation depending on the accompanying multimedia presentation. Further, the information and instructions necessary to create this travel package may exceed the capacity for a single matrix code. Thus, a plurality of matrix codes may be needed to provide the necessary information to gather the additional content for presentation to a user. To provide the plurality of matrix codes, the electronic device may be configured to generate the plurality of codes and display the codes at once on the display device. For example, FIG. 6 is a diagram of a display device 600 of a distribution system displaying a plurality of matrix codes 610-640 containing information for accessing additional content related to the multimedia presentation.

As shown, the display device 600 may display a first matrix code 610, a second matrix code 620, a third matrix code 630 and a fourth matrix code 640. However, while only four matrix codes are shown in FIG. 6, it should be appreciated that any number of matrix codes may be displayed. The use of four matrix codes in FIG. 6 is merely for example. In addition, the matrix codes 610-640 may contain information encoded within the codes. For example, the matrix codes may include information and/or instructions for accessing additional content related to a multimedia presentation. However, the matrix codes may include any information that may be useful to a user of the display device 600, either related to the distribution system or otherwise. In addition, the location of the plurality of matrix codes 610-640 on the display screen may take any form and may be of any size.

In addition to the information contained within the matrix codes, the plurality of matrix codes may also include sequencing information concerning the plurality of sequenced matrix codes. In one embodiment, each matrix code of the plurality of sequenced codes may include a number identifying the position of the code within the sequence of codes, as well as the total number of matrix codes in the sequence. For example, the matrix code may include sequence information in the form of "n of m", where "n" is the particular number within the sequence associated with that particular matrix code and "m" is the total number of the plurality of matrix codes within the sequence. Thus, the matrix code may included the sequence information "4 of 10," indicating that this particular matrix code is the fourth in a series of ten matrix codes. In general, however, the matrix codes may include any sequence information that aids a reader device in determining the correct order in processing of the plurality of matrix codes on the screen.

Once the plurality of matrix codes are generated and displayed on the display device 600, a reader device may be utilized to obtain the plurality of matrix codes in a similar manner as described above. Thus, a still image or video of the display device may be obtained by the reader device. Once obtained, the plurality of matrix codes may be isolated and analyzed as explained above such that the information encoded within the codes may be retrieved. In addition, the sequence information may also be retrieved from the matrix codes such that the reader device may assemble the information retrieved from the codes into an order that may be understood by the reader device. Once the information from the matrix codes is retrieved and assembled, the information may be analyzed or provided over a network. In this manner, a plurality of matrix codes may be displayed on the display device 600 to provide information to a reader device that may exceed the capacity of a single matrix code.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to: a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments.

Functionality may be separated or combined differently in various embodiments of the disclosure or described with different terminology. These and other variations, modifications, additions, and improvements may fall within the scope of the disclosure as defined in the claims that follow.

What is claimed is:

1. A method for providing content to a user of a system, the method comprising;
   generating, utilizing an electronic device, one or more matrix codes including at least one link to additional content related to one or more multimedia presentations;
   transmitting, utilizing the electronic device, the one or more matrix codes and the one or more multimedia presentations to at least one display device;
   receiving the at least one link to additional content from a reader device, wherein the reader device displays the at least one link to additional content related to one or more multimedia presentations;
   accessing additional content related to the one or more multimedia presentations associated with the at least one link; and
   providing the additional content related to the one or more multimedia presentations to the user of the system.

2. The method of claim 1 wherein the at least one link to additional content related to one or more multimedia presentations is encoded within the one or more matrix codes.

3. The method of claim 1 further comprising:
   combining the one or more matrix codes with at least one of the one or more multimedia presentations prior to transmitting the one or more matrix codes and the one or more multimedia presentations to at least one display device.

4. The method of claim 1 further comprising:
   transmitting, utilizing a reader device, the at least one link to additional content related to one or more multimedia presentations over a network connection to the electronic device.

5. The method of claim 1 further comprising:
obtaining, utilizing a reader device, the one or more matrix codes from the at least one display device by acquiring a digital image of the at least one display device.

6. The method of claim 1 wherein the providing operation comprises:
receiving, at the reader device, the additional content related to the one or more multimedia presentations associated with the at least one link; and
displaying, utilizing the reader device, the additional content related to the one or more multimedia presentations to the user of the system.

7. The method of claim 1 wherein the providing operation comprises:
transmitting the additional content related to the one or more multimedia presentations associated with the at least one link to the at least one display device.

8. The method of claim 1 wherein the additional content related to the one or more multimedia presentations comprises a video, audio or text file.

9. The method of claim 1 wherein the one or more matrix codes comprises a plurality of matrix codes that further include sequence information comprising an indication of the position of the plurality of matrix codes within a sequence.

10. A system for providing content to a user of a distribution system comprising:
an electronic device comprising:
at least one processing unit that generates one or more matrix codes including information for a computing device to access additional content related to one or more multimedia presentations; and
at least one output component in communication with a display device, wherein the at least one processing unit transmits the one or more matrix codes and the one or more multimedia presentations to the display device utilizing the output component;
at least one output component configured to receive information for assessing the additional content related to one or more multimedia presentations over a network connection from a reader device; and
a reader device comprising:
at least one optical input component configured to obtain an image of the one or more matrix codes; and
at least one processing unit configured to decode the obtained one or more matrix codes to retrieve information for a computing device to access additional content related to one or more multimedia presentations;
wherein the retrieved information is utilized by a computing device to provide the additional content related to the one or more multimedia presentations to a user of the distribution system.

11. The system of claim 10 further comprising:
a network configured to receive the information for a computing device to access additional content related to one or more multimedia presentations and transmit the information to the computing device.

12. The system of claim 10 wherein the reader device obtains the one or more matrix codes from the display device by acquiring a digital image of the display device.

13. The system of claim 10 wherein the additional content related to one or more multimedia presentations is displayed on the display device concurrently with the one or more multimedia presentations.

14. The system of claim 10 wherein the additional content related to one or more multimedia presentations is displayed on a display screen associated with the reader device.

15. The system of claim 10 wherein the computing device acquires the additional content related to one or more multimedia presentations from a network.

16. A method for obtaining content associated with one or more multimedia presentations, the method comprising:
generating, utilizing an electronic device, one or more matrix codes including instructions to a computing device to access additional content related to one or more multimedia presentations;
transmitting, utilizing the electronic device, the one or more matrix codes and the one or more multimedia presentations to at least one display device;
obtaining, utilizing a reader device, the one or more matrix codes from the at least one display device, wherein the reader device displays the at least one link to additional content;
retrieving the instructions to access additional content related to one or more multimedia presentations by decoding the obtained one or more matrix codes;
transmitting the instructions to access additional content related to one or more multimedia presentations to a computing device;
executing, utilizing the computing device, the instructions to access additional content related to one or more multimedia presentations; and
providing the additional content related to the one or more multimedia presentations to the user of the system.

17. The method of claim 16 further comprising:
combining the one or more matrix codes with at least one of the one or more multimedia presentations prior to transmitting the one or more matrix codes and the one or more multimedia presentations to at least one display device.

18. The method of claim 16 wherein the executing operation comprises:
utilizing at least one processing unit associated with the computing device to obtain information related to the one or more multimedia presentations to create a informational package comprising the additional content.

19. The method of claim 16 wherein the transmitting operation comprises:
providing the instructions to access additional content related to one or more multimedia presentations over a network connection to the computing device.

20. The method of claim 16 wherein the additional content related to the one or more multimedia presentations comprises a video, audio or text file at least partially obtained from a network based on information of the user of the system.

* * * * *

UNITED STATES PATENT AND TRADEMARK OFFICE
CERTIFICATE OF CORRECTION

PATENT NO. : 8,550,334 B2
APPLICATION NO. : 13/037312
DATED : October 8, 2013
INVENTOR(S) : Max S. Gratton et al.

It is certified that error appears in the above-identified patent and that said Letters Patent is hereby corrected as shown below:

In the Claims

<u>Col. 11, lines 38-41 in Claim 10:</u>

Please delete:

"at least one output component configured to receive information for assessing the additional content related to one or more multimedia presentations over a network connection from a reader device; and"

and replace with:

"at least one input component configured to receive information for accessing the additional content related to one or more multimedia presentations over a network connection from a reader device; and"

Signed and Sealed this
Thirty-first Day of December, 2013

Margaret A. Focarino
*Commissioner for Patents of the United States Patent and Trademark Office*